(12) United States Patent
Scheffler (10) Patent No.: US 11,169,692 B2
(45) Date of Patent: Nov. 9, 2021

(54) ELECTRICAL DEVICE WITH TOUCH SCREEN AND USER INTERFACE FOR ADJUSTING SCREEN BRIGHTNESS

(71) Applicant: Marco Scheffler, Berlin (DE)

(72) Inventor: Marco Scheffler, Berlin (DE)

( * ) Notice: Subject to any disclaimer, the term of this patent is extended or adjusted under 35 U.S.C. 154(b) by 0 days.

(21) Appl. No.: 17/033,053

(22) Filed: Sep. 25, 2020

(65) Prior Publication Data

US 2021/0103372 A1    Apr. 8, 2021

(30) Foreign Application Priority Data

Oct. 2, 2019   (DE) .................... 10 2019 126 652.1
Jun. 24, 2020  (DE) .................... 10 2020 116 652.4

(51) Int. Cl.
| | |
|---|---|
| *G06F 3/0488* | (2013.01) |
| *G06F 3/0484* | (2013.01) |
| *G06F 3/0486* | (2013.01) |
| *G06F 3/041* | (2006.01) |
| *G09G 5/10* | (2006.01) |

(52) U.S. Cl.
CPC ........ *G06F 3/0488* (2013.01); *G06F 3/04847* (2013.01); *G09G 5/10* (2013.01); *G06F 3/0412* (2013.01); *G06F 3/0486* (2013.01); *G09G 2320/0606* (2013.01); *G09G 2320/0626* (2013.01); *G09G 2354/00* (2013.01); *G09G 2360/144* (2013.01)

(58) Field of Classification Search
None
See application file for complete search history.

(56) References Cited

U.S. PATENT DOCUMENTS

2013/0162611 A1* 6/2013 Lim .................... G09G 5/003
                                                    345/207
2016/0306533 A1* 10/2016 Agarwal ............. G09G 5/00

FOREIGN PATENT DOCUMENTS

| DE | 199 56 113 A1 | 5/2001 |
|---|---|---|
| DE | 60 2005 003 962 T2 | 12/2008 |
| DE | 10 2012 016 290 A1 | 2/2014 |
| WO | 2007051288 A1 | 5/2007 |

OTHER PUBLICATIONS

IPhone Benutzerhandbuch für iOS6 Software, Apple, Inc. 2012, 8 pages.

(Continued)

*Primary Examiner* — Aneeta Yodichkas
(74) *Attorney, Agent, or Firm* — Patent Capital Group (57) ABSTRACT

The present disclosure relates to a device with a touch screen and a user interface. One object of the present disclosure is to provide a device with a touch screen and a user interface for adjusting the screen brightness, which has an increased ease of use. For this purpose, an electrical device (100) with a touch screen (120) is disclosed which, in a first mode, adjusts the brightness (B) of the screen (120) between a first brightness value (Bmax) and a second brightness value (Bmin1) depending on an input from a user via the touch-sensitive screen (120), and in a second mode, in which the ambient brightness (U) is above the first threshold value (U1), adjusts the brightness (B) of the screen (120) between the first brightness value (Bmax) and a third brightness value (Bmin2) in dependence on an input from a user via the touch screen (120).

20 Claims, 7 Drawing Sheets

(56) References Cited

OTHER PUBLICATIONS

EN Translation (Espacenet.com translate) of Abstract, Description and Claims of DE19956113A1, 9 pages.
EN Translation (Espacenet.com translate) of Abstract, Description and Claims of DE102012016290A1, 8 pages.
EN Translation of Apple iPhone 3GS Manual, Sep. 9, 2020, 6 pages.

* cited by examiner

ELECTRICAL DEVICE WITH TOUCH SCREEN AND USER INTERFACE FOR ADJUSTING SCREEN BRIGHTNESS

CROSS-REFERENCED APPLICATIONS

This application claims the benefit of and priority from German Patent Application No. 10 2019 126 652.1, filed 2 Oct. 2019, and German Patent Application No. 10 2020 116 652.4, filed 24 Jun. 2020, both incorporated herein by referenced in their entirety.

FIELD OF DISCLOSURE

The present disclosure relates to a device with a touch screen and user interface.

BACKGROUND OF THE DISCLOSURE

Display properties of screens can often be adjusted by users, such as brightness, contrast, sharpness, hue, and other display properties.

Simple and correct adjustment of the display properties of a screen can significantly increase the ease of use of a device.

Conventional devices can be set up in such a way that a user can select the mode for adjusting the screen brightness, i.e. the screen brightness can either be adjusted manually, i.e. independently of the ambient brightness, or the screen brightness can be adjusted automatically (adaptively), i.e. depending on the ambient brightness.

For example, automatic (adaptive) adjustment of screen brightness (e.g., backlighting) can occur in an ascending manner (adjusts to changes in ambient light), dynamically (adjusts only to significant changes in ambient light), periodically (adjusts based on a predetermined schedule), or when the device is awake (adjusts when the device is awakened from sleep mode).

Conventional devices are known from DE 199 56 113 A1, DE 60 2005 003 962 T2 and DE 10 2012 016 290 A1.

However, some users find the adaptive adjustment of the screen brightness disturbing because the screen brightness cannot be influenced.

The disadvantage of manually adjusting the screen brightness is that the wide variations in ambient brightness can lead to poor visibility of the information displayed on the screen.

Therefore, one object of the present disclosure is to provide a device with a touch screen and a user interface for adjusting the screen brightness, which has an increased ease of use.

SUMMARY OF THE DISCLOSURE

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

According to an aspect of the present disclosure, an electrical device with a touch screen is disclosed, configured to adjust the brightness (of at least a part) of the screen between a first brightness value and a second brightness value in a first mode in which an ambient brightness is below a threshold value, depending on an input from a user via the touch screen, and in a second mode, in which the ambient brightness is above the threshold value, adjust the brightness (of at least part) of the screen in response to an input from a user via the touch screen between the first brightness value and a third brightness value, the third brightness value being greater than the second brightness value, and the first brightness value being both greater than the third brightness value and greater than the second brightness value.

This allows a user to take advantage of the full brightness range, while it is ensured during relatively low ambient brightness that the user can still reliably recognize the information displayed on the screen. A further advantage is that the user can set the brightness of the screen and adjust it independently of the ambient brightness.

As will be appreciated by one skilled in the art, aspects of the present disclosure, in particular aspects of an electrical device with a touch screen as proposed herein, may be embodied in various manners—e.g. as a method, a device, or a system. Accordingly, aspects of the present disclosure may take the form of an entirely hardware embodiment, at least partially software embodiment (including firmware, resident software, micro-code, etc.) or an embodiment combining software and hardware aspects that may all generally be referred to herein as a "circuit," "module" or "system."

The following detailed description presents various descriptions of specific certain embodiments. However, the innovations described herein can be embodied in a multitude of different ways, for example, as defined and covered by the select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF THE PREFERRED EMBODIMENTS

Figure 1:
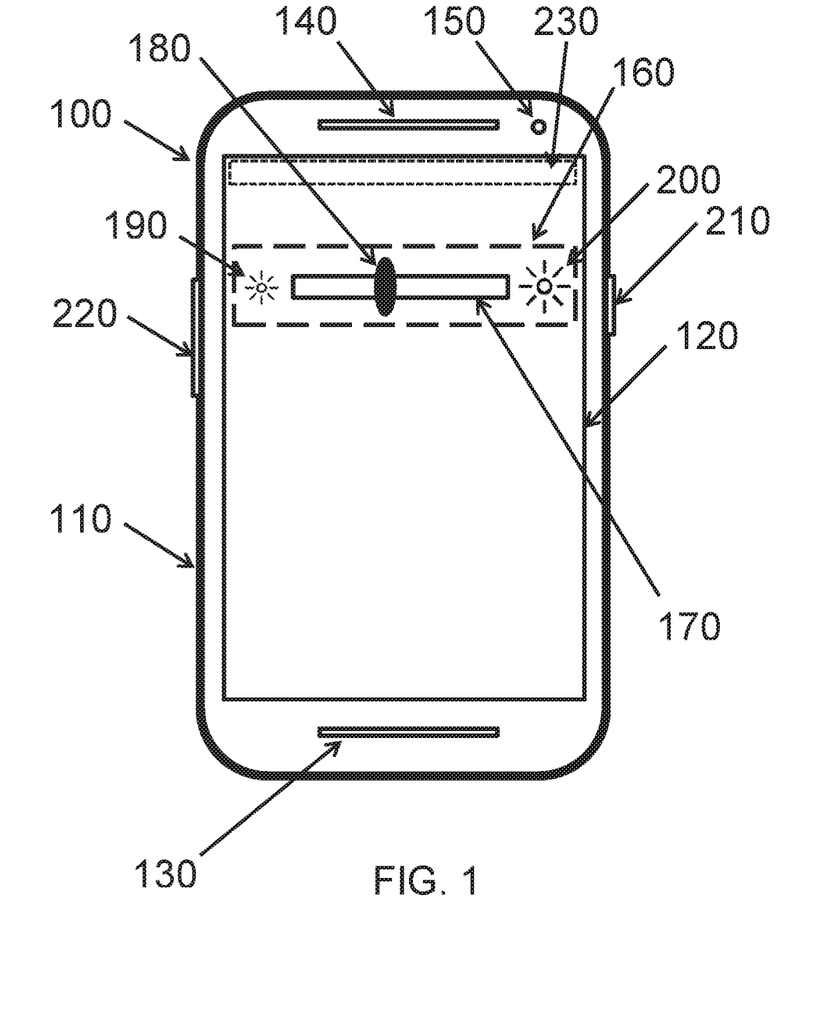
FIG. 1 illustrates a device according to a first embodiment of the disclosure.

FIG. 1 illustrates a device according to a first embodiment of the disclosure.

The device 100 comprises a screen 110, which is configured as a touch screen. The device 100 can be configured as a mobile device such as a smartphone. Alternatively, the device can also be a non-mobile device. The device 100 comprises a frame 110 but may alternatively be configured as a frameless device. The device 100 comprises a control unit, which is not shown, formed by a processor and possibly other components, which controls the brightness of the screen 120.

The device 100 also includes an on/off switch 210 and a volume control 220, each located on one side of the device outside the screen 120. The switches/controls 210 and 220 are designed as physical switches/controls and can therefore be operated without touching the screen. User input can therefore be made via the on/off switch 210, the volume control 220 and the touch screen 120. In addition to the screen 120, the device may also include other display elements, such as a screen on the back of the device 100 or other display elements such as LEDs.

Input via the touch screen 120 is made via a user gesture, for example, by pressing one or more fingers in a predetermined area of the screen (touch input) or by dragging a finger across a predetermined area of the screen (drag and drop input). Further input options, e.g. via gestures with the eyes, are possible. A corresponding (possibly only temporarily displayed) area of the screen 120 whose activation leads to an input is called a user interface and can be displayed, for example, as a soft button, icon or slider on screen 120.

Figure 2:
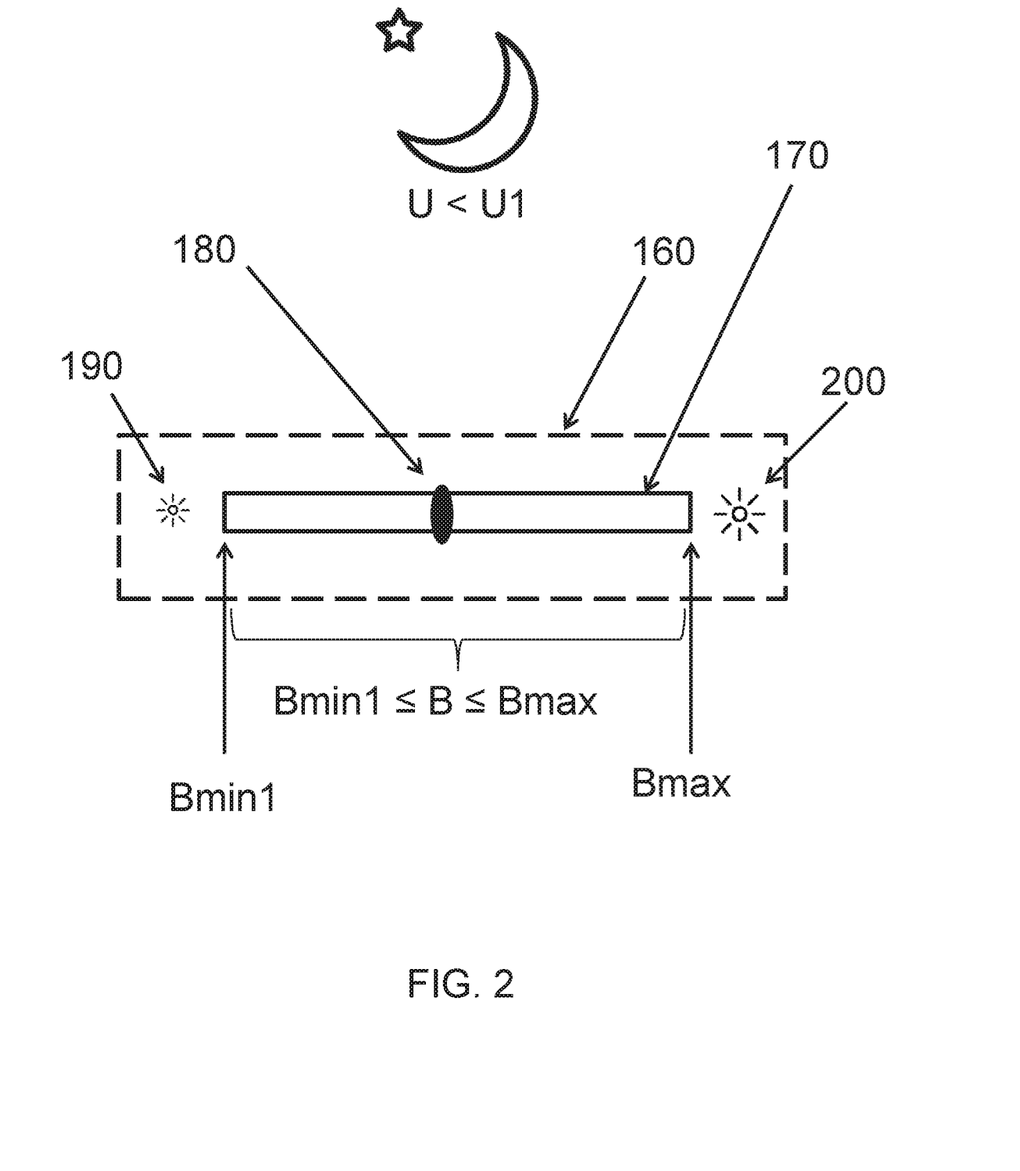
FIG. 2 illustrates an enlarged view of the user interface of the device of the embodiment of FIG. 1 in the first mode.

The device 100 does not have a physical switch for adjusting the brightness of the screen 120, but is configured to allow the user to activate a user interface 160 for adjusting the brightness of the screen 120 during operation, if necessary by making appropriate entries or selecting (a menu) via the touch screen 120. This user interface 160 is provided in the exemplary embodiment by displaying a slider bar 170, a slider 180 and two symbols 190 and 200. Alternatively, the user interface 160 can also have a different design. The user can now make a manual entry by holding down the slider 180 with one finger and moving the finger across the surface of the screen 120. This varies the brightness of the screen 120. In particular, the user can set the brightness of the screen 120 to a minimum adjustable brightness Bmin1 by moving the slider 180 to a first position (left edge of the slider bar 170 at symbol 190) (FIG. 2). In the same way the user can set the brightness of the screen 120 to a maximum adjustable brightness Bmax by moving the slider 180 into a second position (right hand edge of the slider bar 170 at symbol 200). Between the first position and the second position, the user can continuously (or also in small steps) adjust the brightness of the screen 120 by dragging the finger along the slider bar 170 (and releasing it afterwards if necessary), wherein the brightness is continuously increased from the first position to the second position. A manually adjusted brightness value (e.g. after releasing the finger) is maintained (stored) until a new manual adjustment (change) is made.

The device 100 also has a light sensor 150, which is configured to detect the ambient brightness of the device 100. The control unit of the device is configured to determine the ambient brightness of the device 100 from the signal of the sensor 150. However, the ambient brightness does not necessarily have to be determined permanently (which is possible during operation); alternatively, it is possible that the ambient brightness is only determined under certain conditions (possibly periodically).

Figure 3:
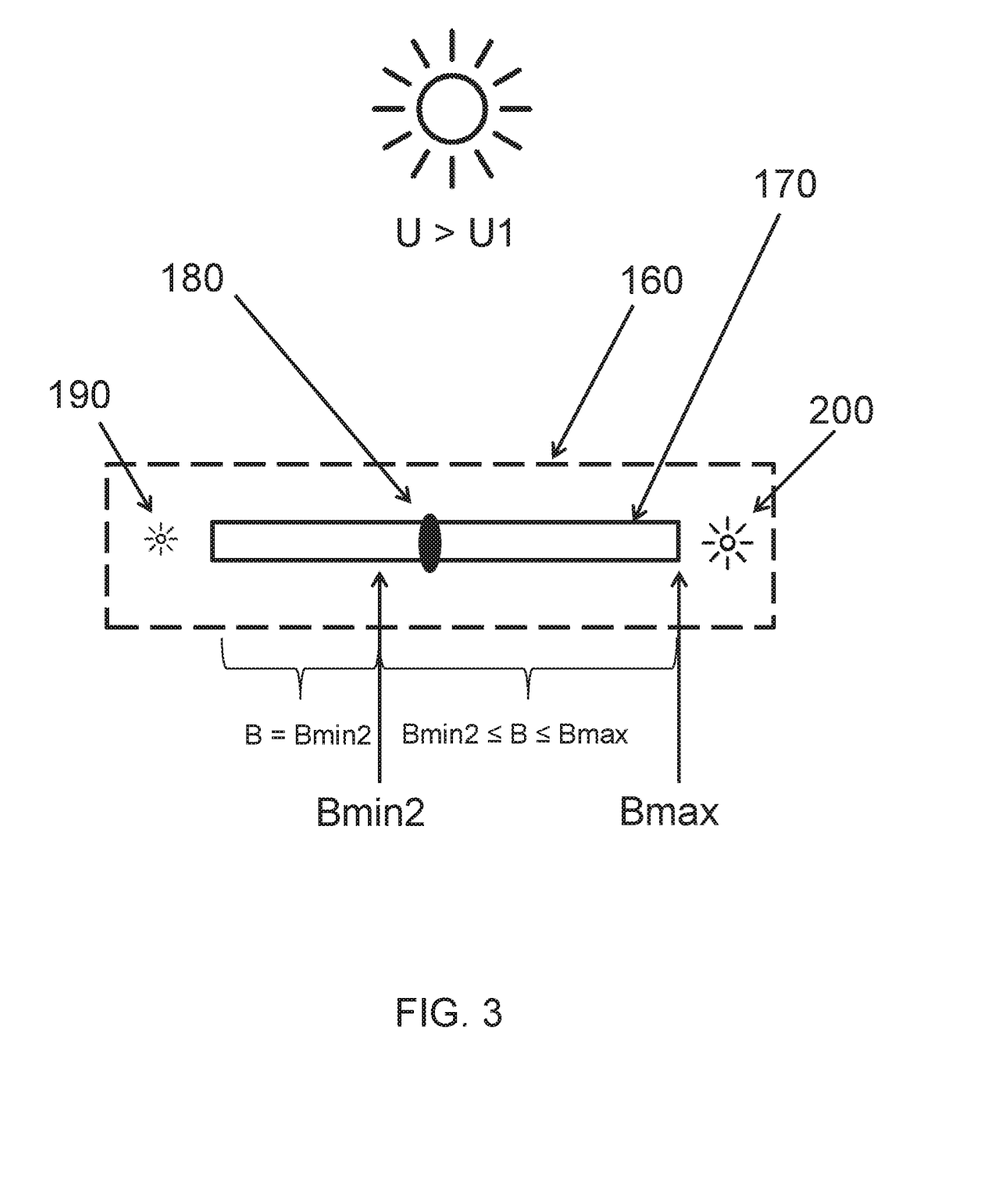
FIG. 3 illustrates an enlarged view of the user interface of the device of the embodiment of FIG. 1 in the second mode.

FIGS. 2 and 3 explain in more detail how controlling the brightness of screen 120 according to the disclosure works.

If the ambient brightness U of the device 100 is less than a first limit value U1, for example less than U1=1000 cd/m$^2$, the device is operated in a first mode. In this first mode the full range between the minimum adjustable brightness Bmin1 and the maximum adjustable brightness Bmax can be used. In other words, if the ambient brightness is relatively low, i.e. less than the preset limit value U1, the user can dim the brightness of the screen 120 down to the minimum adjustable brightness Bmin1. This allows the user to take advantage of the full brightness range, while the relatively low ambient brightness ensures that the user can still reliably recognize the information displayed on the screen 120. A particular advantage is that the user can define the brightness of the screen 120 and adjust it independently of the ambient brightness.

If the ambient brightness U of the device 100 is greater than the first limit value U1, the device automatically switches to a second mode and if the ambient brightness U falls below the first limit value U1 again, the device automatically switches back to the first mode.

In the second mode, especially with very high ambient brightness, it can no longer be guaranteed that the user will be able to reliably recognize the information displayed on the screen 120, at least not if the minimum adjustable brightness Bmin1 is set, i.e. as long as the slider 180 has been moved to the first position. It can be particularly problematic if the user has set the minimum adjustable brightness Bmin1 in a relatively dark environment, then switches the device off and later on starts the device up again in a very bright environment. Then it can happen that the only notices a dark screen and is therefore no longer able to increase the brightness by means of the touch screen 120, which is the only way to adjust the brightness.

The idea of the present disclosure is to provide an exclusively quasi-manual adjustment of the brightness, which ensures that a dark screen can still be sufficiently recognized in high ambient brightness. For this purpose, it is intended to adjust the range within which the user can (infinitely) manually adjust the brightness, depending on the ambient brightness. In other words, the brightness value set by the user is actually displayed according to the position of the slider 180 set by the user as long as reliable detection is guaranteed. If the limit value U1 (FIG. 3) is exceeded, the brightness of the screen 120 is therefore only adjusted according to the (manually) position of the slider 180 set by the user, provided that the brightness value set by the user is equal to or greater than a brightness value Bmin2 determined based on the ambient brightness, which is greater than the minimum brightness Bmin1 that can be set. In the remaining range, i.e. between a first position (Bmin1) of the slider 180 (FIG. 2) and a third position (Bmin2) of the slider 180 (FIG. 3), although the slider 180 is actually set to the position specified by the user, the brightness of screen 120 is set to the value Bmin2 as long as the limit value U1 is exceeded. This is advantageous as with this the manual input of the user is taken into account (and also stored) but a reliable recognition is still ensured.

As soon as the ambient brightness U is less than the limit value U1, the brightness of the screen is adjusted from the value Bmin2 to the actual manually set value (which is below Bmin2).

As an alternative to the above-mentioned embodiment, in which the slider 180 is always set to the position specified by the user and the brightness is set either to the actual manually set value or to Bmin2 depending on the ambient brightness, it is possible to vary the possible setting positions of the slider 180 according to the ambient brightness. In other words, in the second mode the slider 180 can then only be moved between the positions for Bmin2 and Bmax, i.e. only those brightness values between Bmin2 and Bmax corresponding positions on the slider bar 170 can be set. If the user has set a brightness value lower than Bmin2 in the first mode and the ambient brightness later increases beyond the limit value U1, the slider 180 in this alternative embodiment is automatically moved to the position corresponding to Bmin2.

In accordance with a particularly preferred embodiment, in the second mode, if the limit value U1 is exceeded and the manually set brightness value falls below the brightness value Bmin2, the brightness of the entire screen 120 is not set to Bmin2, but only that part of the screen 120 which displays the user interface 160 for setting the brightness of the screen 120. In other words, it is possible for the user to manually adjust, in addition to the user interface 160 for adjusting the brightness, the rest of the screen between the maximum adjustable brightness Bmax and the minimum adjustable brightness Bmin1, regardless of the ambient brightness. Only the user interface 160 is set to a minimum brightness of Bmin2 when the limit value U1 is exceeded to ensure that this user interface 160 remains visible despite high ambient brightness. Alternatively, only a (different) part can be set to Bmin2 (or higher), which in turn includes (displays) the user interface (at least partially).

In accordance with another particularly preferred embodiment, it may be provided that in the second mode, if the limit value U1 is exceeded and the manually set brightness value falls below the brightness value Bmin2, the user interface 160 (possibly due to user inputs or gestures) is even blanked out, which then leads to (almost) the entire screen 120 being set to the manually set brightness value below the brightness value Bmin2, wherein then, in order to ensure the adjustability of a higher brightness, at least one other user interface (during operation of the device, except in stand-by mode) is displayed with the brightness value Bmin2 so that the user interface 160 (then also with the brightness value Bmin2) can be reactivated. In the exemplary embodiment, it is possible, for example, that (in the second mode, in the event that the limit value U1 is exceeded and the manually set brightness value falls below the brightness value Bmin2) the user interface 160 is initially displayed at least with the brightness value Bmin2, while the brightness of the remaining screen 120 is set between the maximum adjustable brightness Bmax and the minimum adjustable brightness Bmin1—corresponding to the manual setting of the slider 180—independently of the ambient brightness. If the user hides the (brighter displayed) user interface 160, for example by wiping it away, at least the status bar 230 continues to be displayed with the brightness Bmin2, via which the user can show the user interface 160 again, for example by wiping it away in the opposite direction, wherein the user interface 160 continues to be displayed with the brightness Bmin2 if the limit value U1 is still exceeded and the manually set brightness value is still below Bmin2.

In accordance with a preferred embodiment, the three values Bmax, Bmin1 and Bmin2 are preset and unchangeable for the specific device. According to another particularly preferred embodiment, however, the brightness value Bmin2 can be varied depending on the ambient brightness U. According to an example, the screen 120 has a maximum adjustable brightness Bmax of 550.00 cd/m$^2$ and a minimum adjustable brightness Bmin1 of 2.00 cd/m$^2$, wherein the brightness Bmin2, which is used as minimum brightness when the limit value U1 is exceeded, is 10.00 cd/m$^2$, for example. It goes without saying that the values for Bmax, Bmin1 and Bmin2 can be selected differently and are device-specific. If the brightness value Bmin2 can be varied depending on the ambient brightness U, it can increase with the limit value U1. For example, the brightness value Bmin2 can be 15.00 cd/m$^2$ (instead of 10.00 cd/m$^2$) with a limit value U1 of 10,000 cd/m$^2$ (instead of 1,000 cd/m) and 25.00 cd/m$^2$ (instead of 10.00 cd/m$^2$) with a limit value U1 of 100,000 cd/m$^2$ (instead of 1,000 cd/m$^2$).

Despite the different brightness values Bmin2, it is intended that the brightness values are always adjusted according to the (infinitely) manually set values and only if the limit value U1 is exceeded and the brightness value falls below the manually set value are the brightness values adjusted to the brightness value Bmin2. This means that although the user is not completely free to set the brightness range between Bmax and Bmin1, either the manually set value or alternatively Bmin2 is always used, which prevents the screen brightness from constantly changing as the ambient brightness changes. In accordance with a preferred embodiment, a hysteresis can be provided for switching between the manually set value and Bmin2 (when switching between first mode and second mode), i.e. switching from the first mode to the second mode only occurs when U1+ΔU is exceeded, while switching from the second mode to the first mode occurs when falling below U1.

Figure 4:
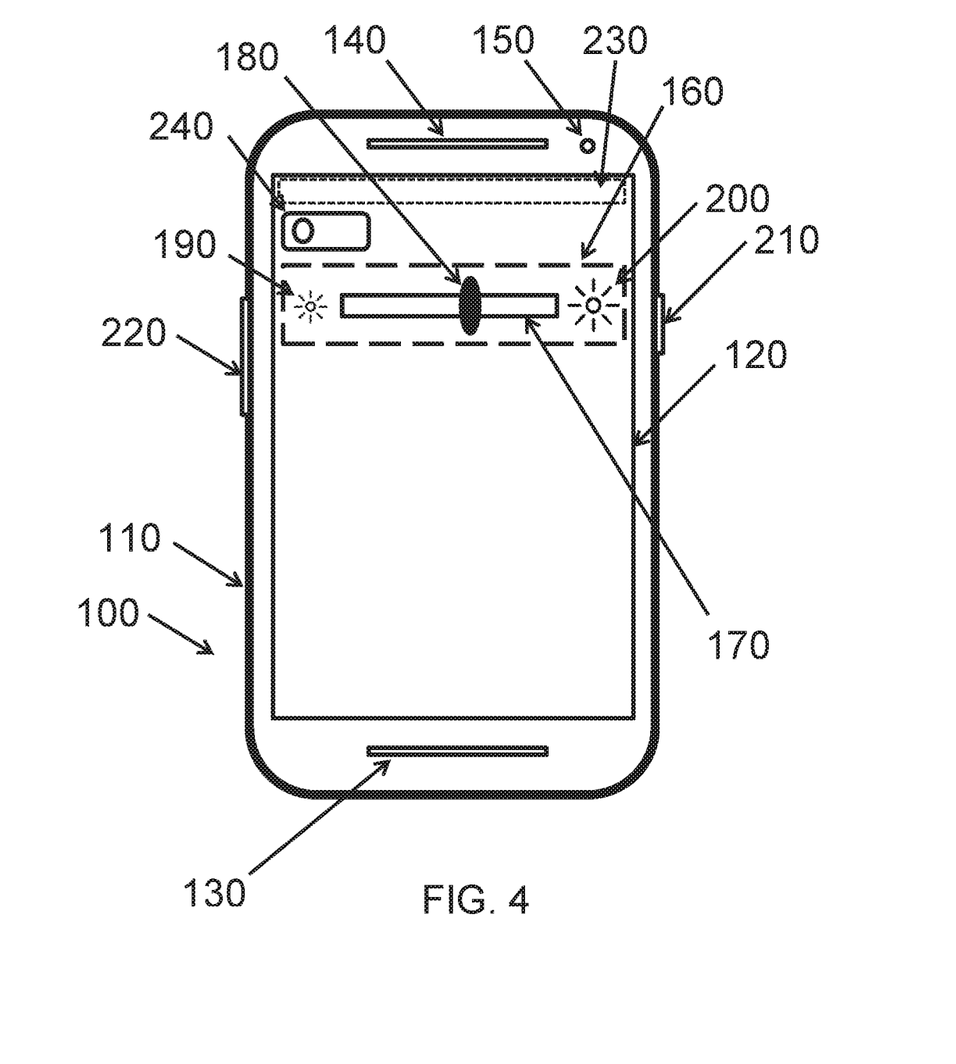
FIG. 4 illustrates a device according to a second embodiment of the disclosure.

FIG. 4 illustrates a device according to a second embodiment.

In addition to the functionality described according to the embodiment in FIG. 1, it is intended to provide a switch (or menu) 240 for selecting the operating mode. The user can, for example, set the device to a conventional operating mode by pressing (touch input) switch 240. The brightness setting via the user interface 160 is independent of the ambient brightness, i.e. the brightness which is manually set between Bmin1 and Bmax (corresponding to the continuously adjustable position of the slider 180 on the slider bar 170) is always used. By pressing (touch input) switch 240 again, the device can be reset to the operating state according to the disclosure, i.e. the user can select whether the device is operated in a conventional (non-ambient brightness adaptive) operating state or in a quasi-non-ambient brightness adaptive operating state in which the actually manually set brightness (corresponding to the continuously adjustable position of the slider 180 on the slider bar 170) is used, but this brightness is adjusted with respect to the lower value when a limit value of the ambient brightness is exceeded.

In addition, it is possible to provide the user with a selection for further operating modes, such as a brightness adaptive operating mode. Such additional operating modes can be activated or selected, for example, via additional switches (touch input). In other words, the device according to the disclosure does not necessarily have to perform the inventive brightness control of the (main) screen permanently, but this brightness control can be selected by a user.

Figure 5:
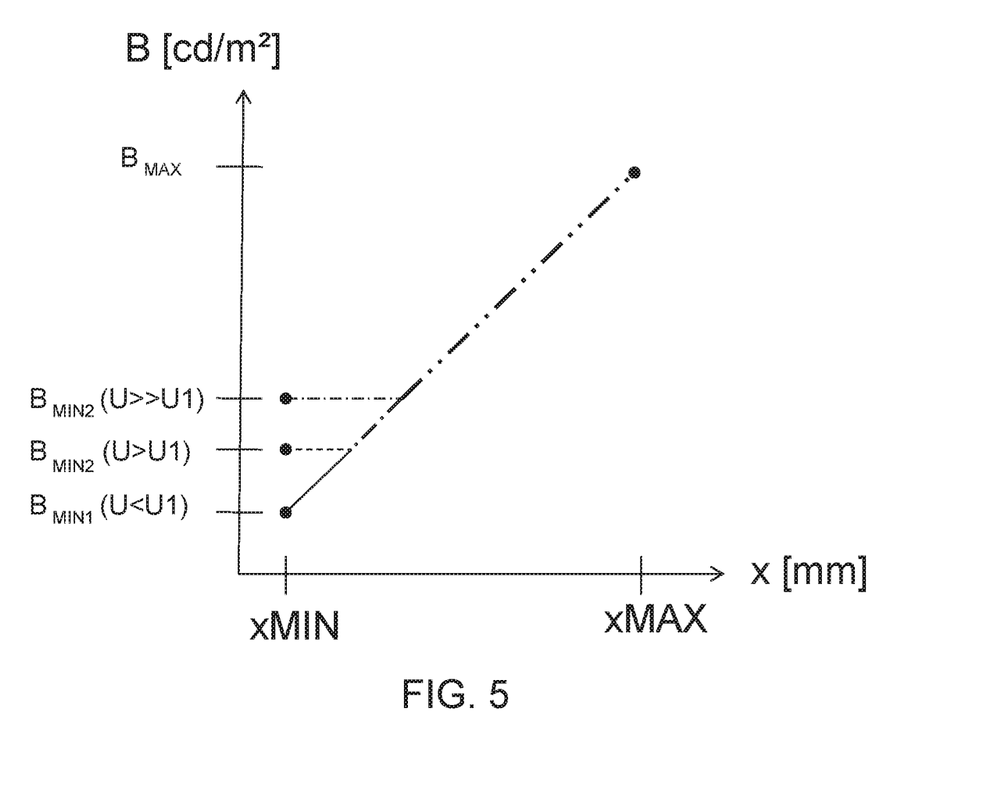
FIG. 5 illustrates the relationship between manual adjustment of the brightness parameter and the screen brightness.

FIG. 5 illustrates the relationship between manual adjustment of the brightness parameter by a user and the maximum screen brightness.

On the abscissa, the position x of the slider 180 (on the slider bar 170) between a first position ($X_{MIN}$) and a second position ($X_{MAX}$), adjustable by dragging a user's finger, is shown. Depending on the size of the screen 120, the length of the slider bar 170 can be, for example, between 3 and 25 cm, preferably between 4 and 10 cm.

It can be seen that the set display brightness B corresponds to the brightness value set manually by the user as long as the ambient brightness U is less than a first limit value U1. In other words, the display brightness B is then completely determined by the user's manual input, i.e. the position of the slider 180 on the slider bar 170. With increased ambient brightness U, this (manual) determination is retained for higher brightness values, but is kept at a minimum level (Bmin2) for low brightness values of the screen 120, so that the slider 180 required for adjusting the screen brightness is still displayed with sufficient contrast. If the ambient brightness U later drops below the limit value U1 again, the screen brightness is set again according to the manual input also below the third brightness value (Bmin2). It can be seen that the third brightness value (Bmin2) can be varied for different ambient brightness U.

Figure 6:
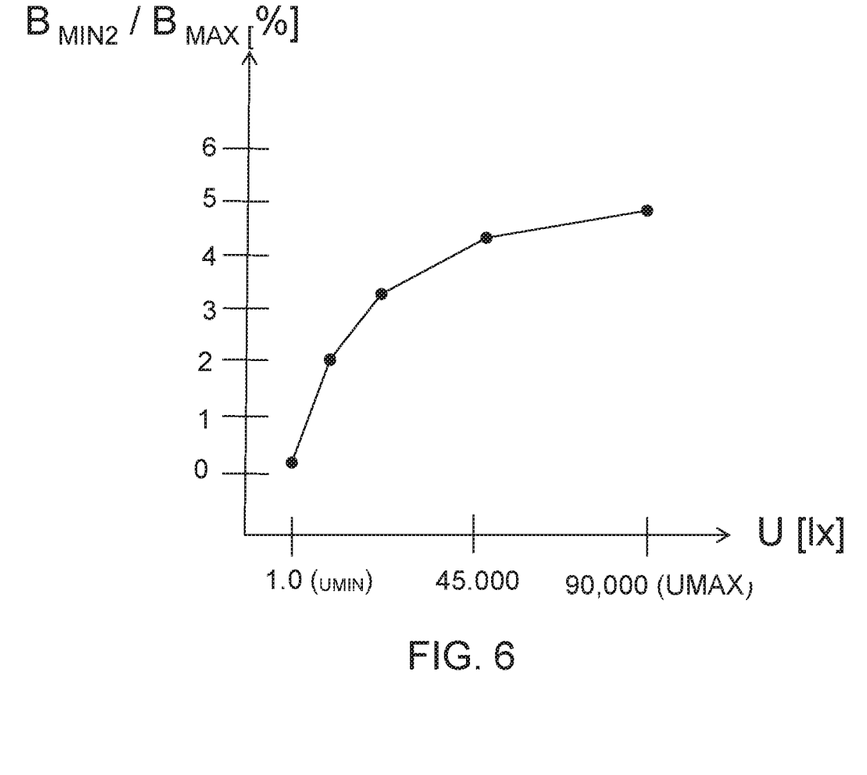
FIG. 6 illustrates the dependence of the third brightness value (or the ratio of the third brightness value to the first brightness value) on the ambient brightness, and FIG. 7 provides a block diagram illustrating an example data processing system that may be configured to implement at least portions of the embodiments of the present disclosure.

FIG. 6 illustrates the dependence of the third brightness value (or the ratio of the third brightness value to the first brightness value) on the ambient brightness U, which is given in lux in the exemplary embodiment of FIG. 6.

It can be seen that the ratio of the third brightness value to the first brightness value, if the third brightness value (Bmin2) is to be varied at all for different ambient brightness U, is in a range between 1 and 6%. This ensures, on the one hand, that the controller 180 required for adjusting the screen brightness is still displayed with sufficient contrast to be conveniently operated by a user with the corresponding ambient brightness U and, on the other hand, that the low screen brightness desired by the user by manual adjustment is still sufficiently guaranteed. In the case of a varying third brightness value (Bmin2), it is preferred that the ratio of the third brightness value to the first brightness value increases with increasing ambient brightness U, but that the increase decreases with increasing ambient brightness U.

According to a further aspects of the present disclosure, an electrical device with a touch screen is disclosed, configured to adjust the brightness (of at least a part) of the screen between a first brightness value and a second brightness value in a first mode in which an ambient brightness is below a threshold value, depending on an input from a user via the touch screen, and in a second mode, in which the ambient brightness is above the threshold value, adjust the brightness (of at least part) of the screen in response to an input from a user via the touch screen between the first brightness value and a third brightness value, the third brightness value being greater than the second brightness value, and the first brightness value being both greater than the third brightness value and greater than the second brightness value. A higher brightness value corresponds to a brighter screen.

The first brightness value may be the maximum luminance ($cd/m^2$) at which the screen can display information. Instead of luminance, other photometric quantities can also be used (radiance or similar).

The second brightness value may be the minimum luminance ($cd/m^2$) at which the screen can display information. The second brightness value is preferably greater than zero. The third brightness value may be a luminance ($cd/m^2$) with which the screen can display information, which lies between the first brightness value and the second brightness value.

Setting the screen with a brightness value may be understood in that the screen displays information with a maximum brightness corresponding to the brightness value. It is understood that a lot of the displayed information is not provided with a maximum brightness (or gray) value. In other words, each pixel is assigned a brightness value between a minimum and a maximum (for example, between 0 and 255 or between 0 and 65536) and depending on the image information, the relative brightness of the pixel is adjusted, e.g., in a representation of a dark room, the brightness values of the individual pixels are close to the minimum, while in a representation of a room flooded with light, the brightness values of the individual pixels are close to the maximum. Setting the screen with a brightness value means that a pixel with a maximum relative brightness value (e.g. 255) is displayed with a maximum brightness corresponding to the brightness value. If the screen is operated with a backlight, this backlight is preferably set to the brightness value.

According to one embodiment, the device is configured to always adjust the brightness of the screen in the first mode independent of the ambient brightness.

According to one embodiment, the device is configured to always adjust the brightness of the screen in the first mode independently of the ambient brightness, wherein the brightness of the screen is continuously increased or decreased depending on an input value (of the user).

According to one embodiment, the device is configured to, in the first mode in which the ambient brightness is below the first threshold value, adjust the brightness of the screen between the first brightness value and the second brightness value via the touch screen in (only) dependence of a user input—but independent of the ambient brightness.

According to one embodiment, the device is configured to adjust the brightness of the screen in the second mode only between the first brightness value and the third brightness value independent of the ambient brightness.

According to one embodiment, the device is configured to adjust the brightness of the screen in the second mode only between the first brightness value and the third brightness value independently of the ambient brightness, wherein the brightness of the screen is continuously increased or decreased in the said range depending on an input value (of the user).

According to one embodiment, the device is configured to, in the second mode, in which the ambient brightness is above the first threshold value, adjust the brightness of the screen (only) depending on a user input—but independent of the ambient brightness—via the touch screen between the first brightness value and the third brightness value.

In other words, the brightness of the screen is adjusted according to a variation between the first brightness value and the third brightness value based solely on a user input (or preset values or stored values based on a previous user input). Changes to the brightness of the screen between the third brightness value and the first brightness value can therefore only be made on the basis of a user input. However, the third brightness value, and thus indirectly the ambient brightness, determines how far the brightness of the screen can be darkened.

According to one embodiment, the third brightness value varies depending on the ambient brightness of the device.

According to one embodiment, the first brightness value and the second brightness value are preset independently of the ambient brightness of the device.

According to one embodiment, the brightness of only a part of the screen is adjusted between the first brightness value and the third brightness value based on a user input via the touch screen. Preferably, the brightness of the rest of the screen is adjusted between the first brightness value and the second brightness value based on a user input from the touch screen.

The screen may be rectangular in shape. The part of the screen for which the brightness is adjusted between the first brightness value and the third brightness value may also be rectangular. It may be preferred that the respective long sides of the rectangles (of the screen and of the said part) are perpendicular to each other.

If the device has more than one screen, the part of the screen for which the brightness is adjusted between the first brightness value and the third brightness value can also be displayed on another screen. If the device has more than one screen, the part of the screen for which the brightness is adjusted between the first brightness value and the third brightness value may be displayed on a smaller screen.

If the device has a display screen which extends beyond a planar main surface (e.g. front surface), it is preferable that that part of the display screen for which the brightness is adjusted between the first brightness value and the third brightness value is displayed on a side surface of the device for which the associated display (part) surface is smaller than the (possibly planar) main surface (front surface).

According to one embodiment, it is intended that in the second mode, in that part of the screen for which the brightness is adjusted between the first brightness value and the third brightness value, a user interface for adjusting the brightness is displayed independently of any user input, while in the first mode the user interface is hidden depending on any user input.

According to one embodiment, in the second mode, the part of the screen for which the brightness is adjusted between the first brightness value and the third brightness value will display a (different) user interface to activate the user interface for adjusting brightness, regardless of any user input.

According to one embodiment, it is intended that the first brightness value is also set independently of the ambient brightness of the device. According to one embodiment, it is intended that the second brightness value is set independently of the ambient brightness of the device.

According to one embodiment, it is intended in the first mode that the brightness of the screen is adjusted between the first brightness value and the second brightness value solely in response to the input of a user via the touch screen.

According to one embodiment, it is intended that in the second mode the brightness of the screen is adjusted between the first brightness value and the third brightness value solely in response to the input of a user via the touch screen.

According to one embodiment, it is intended that the maximum brightness of the screen is set exclusively depending on the input of a user.

According to one embodiment it is intended that the brightness values assigned to a specific user input (e.g. position of the slider) are identical between the first brightness value and the third brightness value in the first mode and in the second mode.

According to one embodiment it is intended that the brightness value (between the second brightness value and the third brightness value) assigned to a specific manual user input (e.g. position of the slider) in the first mode differs from the brightness value (assigned to the same specific manual user input) in the second mode.

The first brightness value may range between 400 and 1500, more preferably between 440 and 1000, even more preferably between 470 and 900, even more preferably between 500 and 800, even more preferably between 520 and 700, even more preferably between 550 and 600 cd/m$^2$.

The second brightness value may range between 0.5 and 4, more preferably between 0.75 and 3, more preferably between 1.0 and 2.5, more preferably between 1.5 and 2.0, more preferably between 1.6 and 1.9, more preferably between 1.7 and 1.8 cd/m$^2$.

The third brightness value may range between 5 and 50, more preferably between 10 and 40, even more preferably between 12 and 35, even more preferably between 14 and 30, even more preferably between 16 and 25, even more preferably between 18 and 22 cd/m$^2$.

The maximum extension (the diagonal if applicable) of the screen may be between 5 and 150, more preferably between 10 and 100, even more preferably between 12 and 35, even more preferably between 14 and 30, even more preferably between 16 and 25, even more preferably between 18 and 22 cm.

The (first) threshold value of the ambient brightness (determined by the sensor) may range between 200 and 100,000, more preferably between 300 and 10,000, even more preferably between 400 and 5,000, even more preferably between 500 and 3,000, even more preferably between 600 and 2,000, even more preferably between 700 and 1,500 cd/m$^2$.

According to one embodiment it is intended that the third brightness value (Bmin2) is varied depending on the ambient brightness, wherein the third brightness value (Bmin2) is increased with increasing ambient brightness.

According to one embodiment, if a user manually sets the screen brightness lower than the third brightness value (Bmin2), it is intended that the screen brightness is only set to the third brightness value (Bmin2) in one part of the screen, wherein the remaining (partial) screen is then not necessarily set to the (very low) brightness value manually set by the user, but is completely deactivated (brightness zero). This leads to energy savings and thus extends the runtime of the possibly battery-powered device.

The ratio between the third brightness value and the first brightness value (Bmin2/Bmax) can be variable, wherein the ratio is preferably increased with increasing ambient brightness. The gradient of the ratio is preferably decreasing with increasing ambient brightness. The ratio between the third brightness value and the first brightness value is preferably between 0.2 and 10, more preferably between 1 and 8 and even more preferably between 2 and 6%

Figure 7:
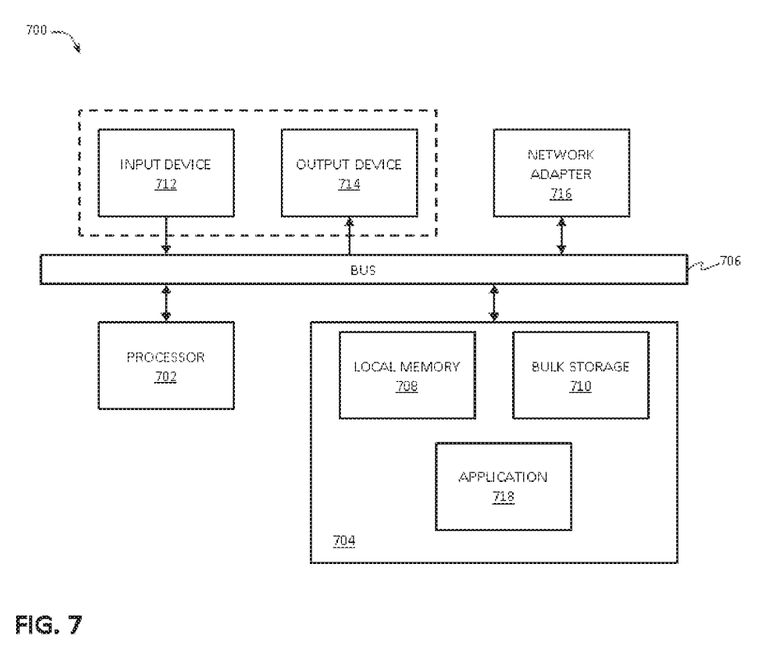

FIG. 7 provides a block diagram illustrating an example data processing system 700 that may be configured to implement at least portions of the embodiments of the present disclosure. In some embodiments, each of the data processing device 100, the housing 110, the screen 120, the microphone 120, the loudspeaker 140, the brightness sensor 150, the user interface 160, the slider bar 170 and the slider 180 may be implemented as, include, or be coupled to the data processing system 700.

As shown in FIG. 7, the data processing system 700 may include at least one processor 702, e.g. a hardware processor 702, coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this disclosure.

In some embodiments, the processor 702 can execute software or an algorithm to perform the activities as discussed in this Specification, in particular activities related to adjustment of the brightness of the output device 714 (screen 120).

The processor 702 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (ASIC), or a virtual machine processor. The processor 702 may be communicatively coupled to the memory element 704, for example in a direct-memory access (DMA) configuration, so that the processor 702 may read from or write to the memory elements 704.

In general, the memory elements 704 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory."

The information being measured (ambient brightness) from the brightness sensor 150, processed (brightness value for screen based on user input) by the processor 702, or any of the components of the data processing system 700 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present FIGS., e.g. the processor 702, can also include suitable interfaces for receiving, transmitting, and/or otherwise communicating data or information in a network environment.

In certain example implementations, mechanisms for adjustment of the brightness of the output device 714 (screen 120) as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 704 shown in FIG. 7, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 702 shown in FIG. 7, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 704 may include one or more physical memory devices such as, for example, local memory 708 and one or more bulk storage devices 710. The local memory may refer to RAM or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution. Various measurement data obtained during the adjustment of the brightness of the output device 714 (screen 120) described herein may be stored in the memory elements 704.

As shown in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

In various embodiments, the application 718 may be an application for adjustment of the brightness of the output device 714 (screen 120).

Input/output (I/O) devices depicted as an input device 712 (e.g. touch-sensitive screen 120) and an output device 714 (e.g. touch-sensitive screen 120, also integrally), optionally, can be coupled to the data processing system. In one embodiment, the input device 712 and the output device 714 may be formed by an integral touch-sensitive display screen 120.

Examples of input devices may include, but are not limited to, a touch-sensitive display screen, a soft keyboard or the like. Examples of output devices may include, but are not limited to, a monitor or a display, speakers, or the like. In some embodiments, the output device 714 may be any type of screen display, such as plasma display, liquid crystal display (LCD), organic light emitting diode (OLED) display, electroluminescent (EL) display, or any other indicator, such as a dial, barometer, or LEDs. The output device 714 may be configured to adjust its brightness (screen 120) in accordance with the present disclosure. For example, the output device 714 may be configured to provide a graphical user interface adapted to input a selection of the user for the screen brightness and to adjust the screen brightness in accordance with the present disclosure. In some implementations, the system may include a driver (not shown) for the output device 714. Input and/or output devices 712, 714 may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

The following reference signs are used in the present disclosure:
100 Device
110 Housing
120 Screen
130 Microphone
140 Loudspeaker
150 Brightness sensor/camera
160 User interface
170 Slider bar
180 Slider
190 Symbol for minimum brightness
200 Symbol for maximum brightness
210 On-Off switch
220 Volume control
230 Status bar
240 Switch for selecting the operating mode

The invention claimed is:

1. A device having a touch screen, the device to: in a first mode, in which an ambient brightness is below a first threshold value, adjust a brightness of the touch screen based on a user input via the touch screen between a second brightness value representing a first minimum adjustable brightness and a first brightness value, and in a second mode, in which the ambient brightness is above the first threshold value, adjust the brightness of the touch screen based on the user input via the touch screen between a third brightness value representing a second minimum adjustable brightness and the first brightness value, wherein the third brightness value is greater than the second brightness value, and wherein the first brightness value is both greater than the third brightness value and greater than the second brightness value.

2. The device of claim 1, wherein the device is a mobile device.

3. The device of claim 1, wherein the third brightness value is based on the ambient brightness of the device.

4. The device of claim 1, wherein the first brightness value and the second brightness value are preset independently of the ambient brightness of the device.

5. The device of claim 1, wherein the brightness of the touch screen in the first mode is adjusted between the second brightness value and the first brightness value exclusively in dependence on the user input.

6. The device of claim 1, wherein the brightness of the touch screen in the second mode is adjusted between the first brightness value and the third brightness value exclusively in dependence on the user input.

7. The device of claim 1, wherein in each case the maximum brightness of the touch screen is set exclusively in dependence on the user input.

8. The device of claim 1, wherein the brightness values associated with the user input are identical between the first brightness value and the third brightness value in the first mode and in the second mode.

9. The device of claim 1, wherein the brightness values associated with the user input are different between the second brightness value and the third brightness value in the first mode from the brightness values associated with the user input in the second mode.

10. The device of claim 1, wherein, in the first mode and in the second mode, the brightness of the touch screen is adjusted independently of the ambient brightness.

11. The device of claim 1, wherein the brightness of the screen in its entirety is adjusted based on the user input.

12. The device of claim 1, wherein the brightness of the screen in its entirety is adjusted based on the user input independently of the ambient brightness.

13. A non-transitory computer-readable storage medium comprising instructions for execution which, when executed by a processor, are operable to perform operations comprising:

adjusting, based on a user input in a first mode, a screen brightness between a second brightness value representing a first minimum adjustable brightness and a first brightness value wherein, in the first mode, an ambient brightness is below a first threshold value; and adjusting, based on the user input in a second mode, the screen brightness between a third brightness value representing a second minimum adjustable brightness and the first brightness, wherein, in the second mode, the ambient brightness is above the first threshold value, wherein the third brightness value is greater than the second brightness value, and wherein the first brightness value is both greater than the third brightness value and greater than the second brightness value.

14. The non-transitory computer-readable storage medium of claim 13, wherein the third brightness value is based on a value indicating the ambient brightness of the device.

15. The non-transitory computer-readable storage medium of claim 13, wherein the first brightness value and the second brightness value are preset independently of the first threshold value.

16. The non-transitory computer-readable storage medium of claim 13, wherein the touch screen brightness is adjusted in the first mode between the first brightness value and the second brightness value exclusively in dependence on the user input.

17. The non-transitory computer-readable storage medium of claim 13, wherein the brightness of the screen in its entirety is adjusted based on the user input.

18. The non-transitory computer-readable storage medium of claim 13, wherein the brightness of the screen in its entirety is adjusted based on the user input independently of the ambient brightness.

19. A processor-implemented method, comprising:
adjusting, based on a user input in a first mode, a screen brightness between a second brightness value representing a first minimum adjustable brightness and a first brightness value, wherein, in the first mode, an ambient brightness is below a first threshold value; and adjusting, based on the user input in a second mode, the screen brightness between a third brightness value representing a second minimum adjustable brightness and the first brightness value, wherein, in the second mode, the ambient brightness is above the first threshold value,
wherein the third brightness value is greater than the second brightness value, and wherein the first brightness value is both greater than the third brightness value and greater than the second brightness value.

20. The processor-implemented method according to claim 19, wherein the brightness of the screen in its entirety is adjusted based on the user input independently of the ambient brightness.

\* \* \* \* \*